March 27, 1962     L. R. CORVISIER     3,026,732
DEVICE FOR TRANSFERRING MOTION THROUGH AN IMPERFORATE SEAL
Filed Sept. 3, 1958
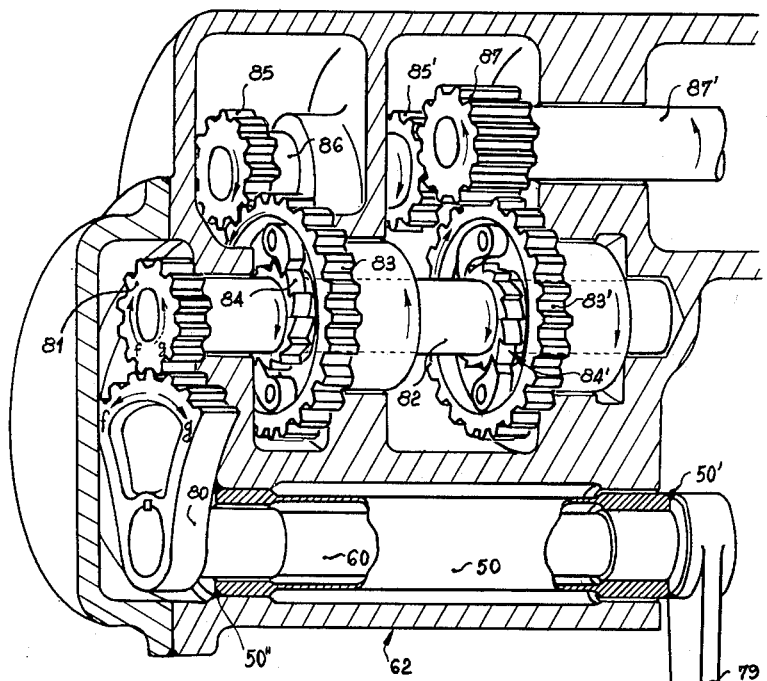
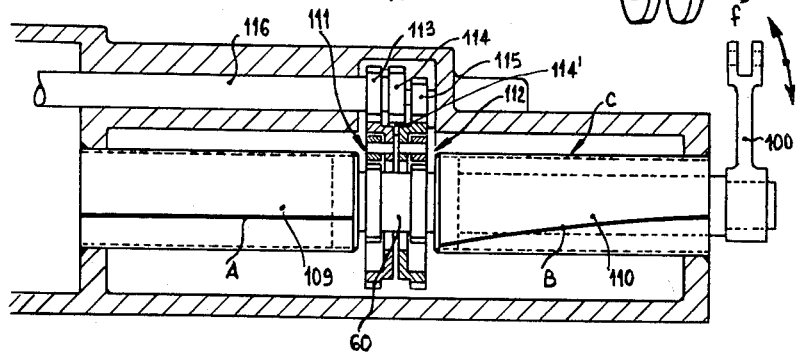
INVENTOR:
LOUIS RENÉ CORVISIER
By Squire & Olcott

United States Patent Office 3,026,732
Patented Mar. 27, 1962

3,026,732
DEVICE FOR TRANSFERRING MOTION THROUGH AN IMPERFORATE SEAL
Louis René Corvisier, 9 Ave. du General Laperrine, Paris, France
Filed Sept. 3, 1958, Ser. No. 758,854
Claims priority, application France Sept. 20, 1957
3 Claims. (Cl. 74—18)

The present invention relates to apparatus for converting oscillatory angular displacements of a first shaft about its longitudinal axis into unidirectional angular displacements of a second shaft about its longitudinal axis while maintaining a positive fluid-tight pressure seal between the two shafts.

Briefly, the invention comprises a fluid-tight enclosure for the second shaft and a torsion tube sealingly connecting the first shaft with the interior of the enclosure. The torsion tube may be twisted through an angle sufficient to accommodate the angular oscillatory displacements of the first shaft.

In a modification of the invention, two torsion tubes may be used one of which becomes twisted while the other tube untwists.

The invention will be better understood from the following specification, reference being had to the accompanying drawing forming a part hereof.

Referring to the drawing:

FIGURE 1 is a perspective view, partly in section, showing an embodiment of the invention.

FIGURE 2 is a view in sectional elevation showing a modification of the embodiment of FIG. 1, two torsion tubes being used in this instance.

Referring to FIG. 1, the first shaft which oscillates angularly about its longitudinal axis is designated 60 and is fixedly connected at one end to an arm or link 79 to which an angular reciprocating movement is applied in the direction of the arrows f and g, and at its other end a toothed sector 80 driving through a pinion 81 an intermediate shaft 82. The torsion tube 50 has one end fitted on the oscillatory shaft 60 and welded at 50', and its other end fitted in the fluid-tight case 62 to which it is welded at 50''.

Mounted on the intermediate shaft 82 are two intermediate pinions 83, 83', ratchet wheels or like devices 84, 84', mounted in opposite directions being interposed between this shaft 82 and the pinions 83, 83'. The toothed pinion 83 meshes with a pinion 85 solid with another intermediate shaft 86 carrying a pinion 85' transmitting the rotational drive to a pinion 87 keyed or otherwise secured on the driven shaft 87'. On the other hand, the pinion 83' meshes directly with the pinion 87. With this mounting it is clear that the reciprocatory or oscillatory angular movement of the lever or arm 79 determines a rotational movement of the shaft 87' which always takes place in the same direction, the transmission occurring, when the connecting-rod 79 moves in the direction of the arrow f, through the pinions 83' and 87, pinion 83 acting as a free-wheel, and when the connecting-rod 79 moves in the direction of the arrow g, through the pinions 83, 85, 85' and 87, the pinion 83' acting in this case as a free-wheel.

In the device shown in FIG. 2, two torsion tubes 109, 110 are mounted on a common transmission element 60 adapted to convert the alternating oscillating or angular motion applied thereto by the arm or lever 100 into a unidirectional rotational movement through the intermediary of a pair of ratchet wheels 111, 112 driving in turn through intermediate pinions 113, 114 and coaxial intermediate pinions 114', 115, the shaft 116. The two torsion tubes 109, 110 are mounted in opposite directions so that the rotation of element 60 is attended—whether it rotates in one or the other direction—by the torsion of one tube and the untwisting of the other tube as illustrated in FIG. 2 in the case of tubes 110 and 109, respectively.

Various changes and modifications may be made in the specific preferred embodiments which are herein shown and described without departing from the spirit and scope of the invention as defined in the appended claims.

What I claim is:

1. In a device for transmitting the mechanical energy of a power means to a driven member through tight walls defining a closed space under pressure different from the pressure outside of said space and including an oscillatory lever, an oscillatable shaft secured to said oscillatory lever and passing through a passage in said walls, and ratchet-like means mechanically coupling said shaft to said driven member for translating the oscillatory motion of said shaft into unidirectional rotation of said driven member, the provision of relatively rigid tubular torsion means having one of its ends force-fitted and permanently joined in fluid tight manner in said passage and its other end force-fitted and permanently joined in fluid tight manner coaxially on said oscillatable shaft, said tubular torsion means being sufficiently rigid to provide bearing-like axial stability to said shaft.

2. A device as claimed in claim 1 in which a second tubular torsion means is provided, one end of each tubular means being secured to said wall portion, the other end being secured to said first rotatable shaft.

3. A device as defined in claim 1 in which said tubular torsion means is made of a material having a preset fibre structure directed coaxially as a helix around the tube axis.

References Cited in the file of this patent

UNITED STATES PATENTS

| | | |
|---|---|---|
| 984,303 | Schlacks | Feb. 14, 1911 |
| 1,089,483 | Laffond | Mar. 10, 1914 |
| 1,173,038 | Roschanek | Feb. 22, 1916 |
| 1,197,013 | Cummings | Sept. 5, 1916 |
| 1,201,356 | Schenck | Oct. 17, 1916 |
| 1,428,382 | Marguette | Sept. 5, 1922 |
| 1,525,730 | Gates | Feb. 10, 1925 |
| 1,575,850 | Limpert et al. | Mar. 9, 1926 |
| 1,830,004 | Skoverski | Nov. 3, 1931 |
| 1,954,890 | Rembert et al. | Apr. 17, 1934 |
| 1,955,696 | Von Schutz et al. | Apr. 17, 1934 |
| 1,966,537 | Binckley | July 17, 1934 |
| 2,219,040 | Harper | Oct. 22, 1940 |
| 2,226,800 | Bessey | Dec. 31, 1940 |
| 2,305,666 | Bolseg | Dec. 22, 1942 |
| 2,599,159 | Breedlove | June 3, 1952 |
| 2,677,280 | Ceulemans | May 4, 1954 |
| 2,698,544 | Hausen | Jan. 4, 1955 |
| 2,749,779 | Godat | June 12, 1956 |
| 2,833,872 | Oberholzer | May 6, 1958 |
| 2,842,970 | Quiroz | July 15, 1958 |
| 2,842,971 | Cornell | July 15, 1958 |
| 2,847,522 | Bernard | Aug. 12, 1958 |

FOREIGN PATENTS

| | | |
|---|---|---|
| 458,962 | Great Britain | Dec. 30, 1936 |
| 567,090 | Great Britain | Jan. 26, 1945 |